(12) United States Patent
Blazek et al.

(10) Patent No.: US 7,377,229 B2
(45) Date of Patent: May 27, 2008

(54) WINDOW ASSEMBLY AND METHOD FOR DROPDOWN FEED DOORS

(75) Inventors: Joseph L. Blazek, Cassopolis, MI (US); George K Abou-Khaled, Granger, IN (US)

(73) Assignee: State Wide Aluminum, Inc., Elkhart, IN (US)

( * ) Notice: Subject to any disclaimer, the term of this patent is extended or adjusted under 35 U.S.C. 154(b) by 486 days.

(21) Appl. No.: 11/197,209

(22) Filed: Aug. 3, 2005

(65) Prior Publication Data

US 2007/0028850 A1 Feb. 8, 2007

(51) Int. Cl.
*A01K 5/00* (2006.01)
*E05C 17/00* (2006.01)

(52) U.S. Cl. .................................. 119/411; 49/394
(58) Field of Classification Search ............... 119/411, 119/61.1, 61.3; 296/146.2, 146.16, 24.31; 49/365, 371, 380, 381, 394, 279, 272
See application file for complete search history.

(56) References Cited

U.S. PATENT DOCUMENTS

| | | | |
|---|---|---|---|
| 2,174,781 A | | 10/1939 | Edwards |
| 4,327,523 A | * | 5/1982 | Gravely ...................... 49/141 |
| 4,377,055 A | | 3/1983 | Frederick |
| 4,790,580 A | * | 12/1988 | Casilio ...................... 292/262 |
| 5,231,948 A | | 8/1993 | Malmanger et al. |
| 5,315,798 A | | 5/1994 | Zarwell |
| 5,471,792 A | * | 12/1995 | Higgins et al. ............... 49/365 |
| 5,810,412 A | | 9/1998 | Hall |
| 6,334,277 B1 | | 1/2002 | Condino |
| 6,793,270 B2 | | 9/2004 | van der Vegt et al. |
| 2004/0103587 A1 | | 6/2004 | Fletcher et al. |
| 2005/0086879 A1 | * | 4/2005 | Sales ......................... 52/204.1 |

* cited by examiner

*Primary Examiner*—Yvonne R. Abbott
(74) *Attorney, Agent, or Firm*—Price, Heneveld, Cooper, DeWitt & Litton, LLP

(57) ABSTRACT

A window assembly and related method for dropdown feed doors and the like includes a rigid marginal frame configured for close reception in an associated opening in the feed door. A mullion has opposite ends connected with top and bottom portions of the frame. A latch arm is supported by the mullion, projects upwardly from the top portion of the frame, and is shifted between a locked position to retain the feed door in a raised, closed position, and an unlocked position to rotate the feed door to a lowered, open position. A latch actuator is mounted on the mullion at a selected position vertically spaced apart from the latch arm, and includes a slide which shifts between latched and unlatched positions. A connector has opposite ends connected with the latch arm and the slide, so that movement of the slide between the latched and unlatched positions shifts the latch arm between the locked and unlocked positions, such that the latch assembly is integrated into the window assembly to facilitate fabrication of the feed door. Preferably, the connector is a flexible line, and the latch actuator is configured to be mounted at a variety of different vertical locations along the mullion by adjusting the length of the flexible line, so as to accommodate convenient access by a wide variety of different height users.

37 Claims, 4 Drawing Sheets

WINDOW ASSEMBLY AND METHOD FOR DROPDOWN FEED DOORS

BACKGROUND OF THE INVENTION

The present invention relates to dropdown access doors, and in particular to feed doors and related door fabrication methods for animal transport vehicles and the like.

Animal transport vehicles, such as trailers and the like, are equipped for transporting horses and other large animals, and frequently have operable windows. Such windows can be opened to allow ventilation of the interior of the trailer or closed during inclement weather. The windows can be located in a dropdown door that pivots open about a bottom hinge mechanism, such as those known in the trade as feed doors. Such doors may be opened or closed by moving a slide from an unlatched to a latched position when a user moves an associated latch actuator.

In many feed doors, such as that disclosed in U.S. Pat. No. 5,810,412, the latch actuator is not integrated into the window assembly, but rather is mounted separately in the feed door. Such constructions normally require routing latch mechanics through the interior of the door, which results in increased fabrication cost and complexity, and typically provide limited latching configurations and application options.

Furthermore, it is desirable to provide the latch actuator in a position that can be easily reached and actuated by the animal trainer, handler or other similar personnel. Oftentimes, the latch actuator is located at a position toward the top of the window, requiring either a tall person or a person of normal height standing on a stool to reach and actuate the latch actuator so that the door can be opened.

Accordingly, a door actuator that is integrated into the window assembly, and can be mounted on the window of the feed door of the horse trailer in various easy-to-reach positions, is desirable, and would represent a significant advancement in the art of animal transport vehicles.

SUMMARY OF THE INVENTION

One aspect of the present invention is an animal transport vehicle of the type having upright exterior walls arranged to define at least one interior animal stall. An improved windowed dropdown feed door includes a rigid door panel shaped to close an associated opening in one of the walls of the animal transport vehicle. The rigid door panel includes a centrally disposed window opening therethrough. At least one hinge is connected with a bottom portion of the door panel and the one wall of the animal transport vehicle to permit the feed door to be rotated between a raised, closed position and a lowered, open position. A window assembly has a rigid marginal frame with interconnected top, bottom, and side portions configured for close reception in the window opening in the feed door. A mullion member extends vertically between the top and the bottom portions of the marginal frame and has opposite ends thereof connected with the marginal frame. A latch assembly has a latch arm which is supported by the mullion, projects upwardly from a top portion of the door panel and is configured for shifting selectively between a locked position, wherein the latch arm engages the one wall of the animal transport vehicle to retain the feed door in the raised, closed position, and an unlocked position, wherein the feed door is free to be rotated to the lowered, open position. A latch actuator is mounted on the mullion member at a predetermined position spaced vertically apart from the latch arm, and includes a slide which is translated vertically between latched and unlatched positions. A connector member has one end operably connected with the latch arm, and an opposite end operably connected with the slide, whereby movement of the slide between the latched and unlatched positions shifts the latch arm between the locked and unlocked positions, such that the latch assembly is integrated into the window assembly to facilitate fabrication of the feed door.

Another aspect of the present invention is to provide a windowed dropdown feed door for animal transport vehicles of the type having upright exterior walls arranged to define at least one interior animal stall. A rigid door panel is shaped to close an associated opening in one of the walls of the animal transport vehicle, and includes a centrally disposed window opening therethrough. At least one hinge is connected with a bottom portion of the door panel and the one wall of the animal transport vehicle to permit the feed door to be rotated between a raised, closed position and a lowered, open position. A window assembly has a rigid marginal frame having interconnected top, bottom and side portions configured for close reception in the window opening in the feed door. A mullion member extends vertically between the top and the bottom portions of the marginal frame, and has opposite ends thereof connected with the marginal frame. A latch assembly has a latch arm supported by the mullion member, projects upwardly from a top portion of the door panel and is configured for shifting selectively between a locked position, wherein the latch arm is configured to engage the one wall of the animal transport vehicle to retain the feed door in the raised, closed position, and an unlocked position, wherein the feed door is free to be rotated to the lowered open position. A latch actuator is mounted on the mullion member at a predetermined position spaced vertically apart from the latch arm, and includes a slide which is translated vertically between latched and unlatched positions. A connector member has one end operably connected with the latch arm, and an opposite end operably connected with the slide, whereby movement of the slide between the latched and unlatched positions shifts the latch arm between the locked and unlocked positions, such that the latch assembly is integrated into the window assembly to facilitate fabrication of the feed door.

Yet another aspect of the present invention is to provide a window assembly for dropdown feed doors of the type used for animal transport vehicles having upright exterior walls arranged to define at least one interior stall. A rigid marginal frame has interconnected top, bottom and opposite side portions configured for close reception in an associated opening in an associated feed door. A mullion member extends vertically between the top and the bottom portions of the marginal frame, and has opposite ends connected with the marginal frame. A latch assembly has a latch arm which is supported by the mullion member, projects upwardly from the top portion of the marginal frame and is configured for shifting selectively between a locked position, wherein the latch arm engages an adjacent wall of the animal transport vehicle to retain the feed door in a raised, closed position, and an unlocked position, wherein the feed door is free to be rotated to a lowered, open position. A latch actuator is mounted on the mullion member at a predetermined position spaced vertically from the latch arm, and includes a slide which is translated vertically between latched and unlatched positions. A connector member has one end operably connected with the latch arm, and an opposite end operably connected with the slide, whereby movement of the slide between the latched and unlatched positions shifts the latch arm between the locked and unlocked positions, such that the latch assembly is integrated into the window assembly to facilitate fabrication of the feed door.

Yet another aspect of the present invention is to provide a method for making a window assembly for dropdown feed doors of the type used for animal transport vehicles having upright exterior walls arranged to define at least one interior stall. A rigid marginal frame is formed with interconnected top, bottom and opposite side portions configured for close reception in an associated opening in an associated feed door. A mullion member is positioned vertically between the top and the bottom portions of the marginal frame. Opposite ends of the mullion are operably connected with the marginal frame. A slidable latch arm is mounted on the mullion member to project upwardly from the top portion of the marginal frame for shifting selectively between a locked position, wherein the latch arm engages an adjacent wall of the animal transport vehicle to retain the feed door in a raised, closed position, and an unlocked position, wherein the feed door is free to be rotated to a lowered, open position. A latch actuator is mounted on the mullion member at a position vertically spaced from the latch arm, and includes a slide which is translated vertically between latched and unlatched positions. A connector member is provided and has one end that is configured for operable connection with the latch arm, and an opposite end that is configured for operable connection with the slide. The latch actuator is mounted at a predetermined vertical location on the mullion member, spaced vertically apart from the latch arm. One end of the connector member is connected with the latch arm, and the opposite end is connected with the slide, whereby movement of slide between the latched and unlatched positions shifts the latch arm between the locked and unlocked positions, such that the latch arm, latch actuator and connector member are integrated into the window assembly to facilitate fabrication of the feed door.

These and other features, advantages and objects of the present invention will be further understood and appreciated by those skilled in the art upon studying the following specification, claims, and appended drawings.

DETAILED DESCRIPTION OF PREFERRED EMBODIMENTS

Figure 2:
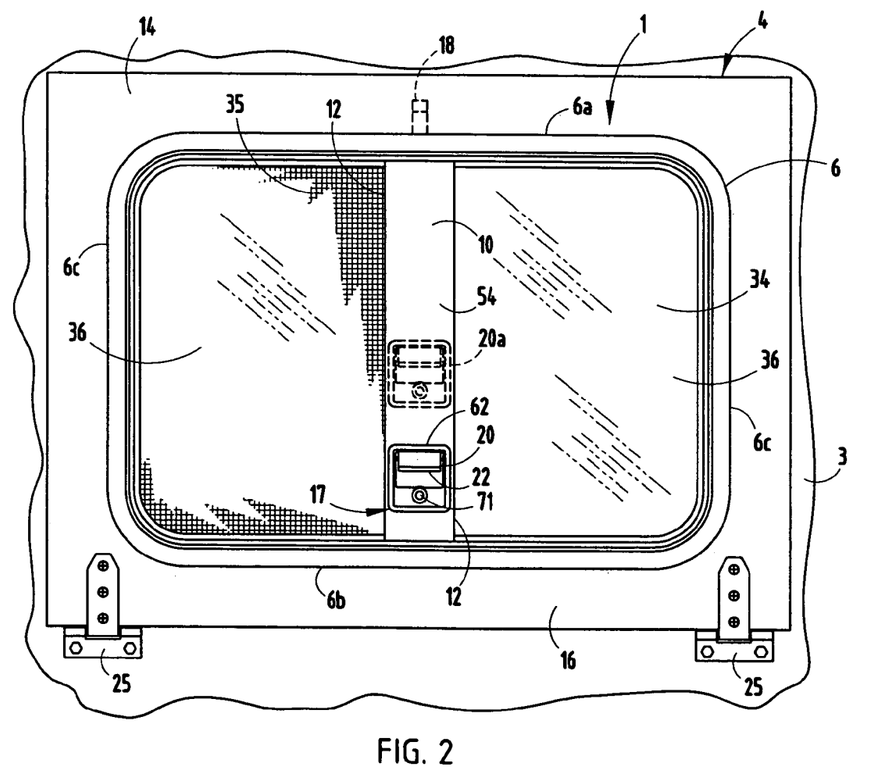
FIG. 2 is a front elevational view of a feed door mounted in a sidewall of the trailer, and incorporating the window assembly.

For purposes of description herein the terms "upper", "lower", "right", "left", "rear", "front", "vertical", "horizontal" and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
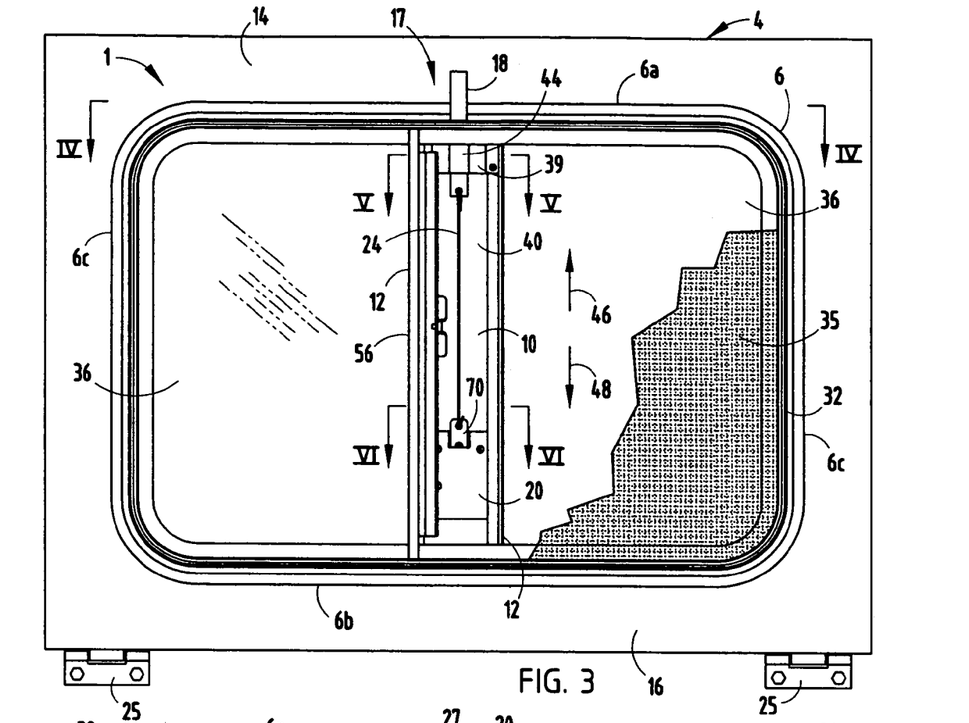
FIG. 3 is a rear elevational view of the feed door and window assembly of FIG. 2.

The reference numeral 1 (FIGS. 1-3) generally designates a window assembly embodying the present invention, which is particularly adapted for use in conjunction with animal transport vehicles and the like, such as the illustrated horse trailer 2, which has two side-by-side dropdown feed doors 4 with window assemblies 1. Each window assembly 1 is mounted in an associated dropdown feed door 4, includes a rigid marginal frame 6 that has interconnected top, bottom and opposite side portions, 6a, 6b, and 6c, respectively, and is configured for close reception in an associated opening 8 in feed door 4. A mullion 10 has opposite ends 12 connected with the top and bottom portions 6a, 6b of frame 6. Each window assembly 1 includes an integrated latch assembly 17, comprising a latch arm 18 which is supported by mullion 10, projects upwardly from the top portion 6a of the frame 6, and is shifted between a locked position to retain the feed door 4 in a raised, closed position, and an unlocked position to rotate the feed door 4 to a lowered, open position. A latch actuator 20 is mounted on the mullion 10 at a selected position spaced vertically apart from latch arm 18, and includes a slide 22 which shifts between latched and unlatched positions. A connector member 24 has opposite ends connected with latch arm 18 and slide 22, so that movement of slide 22 between the latched and unlatched positions shifts latch arm 18 between the locked and unlocked positions, such that latch assembly 17 is integrated into window assembly 1 to facilitate fabrication of feed door 4. Preferably, connector member 24 is in the form of a flexible line, and the latch actuator 20 is configured to be mounted in a variety of different vertical locations along mullion 10 (as indicated by the latch actuator 20a shown in phantom in FIG. 2) by adjusting the length of flexible line 24, so as to accommodate convenient access by a wide variety of different height users.

Figure 1:
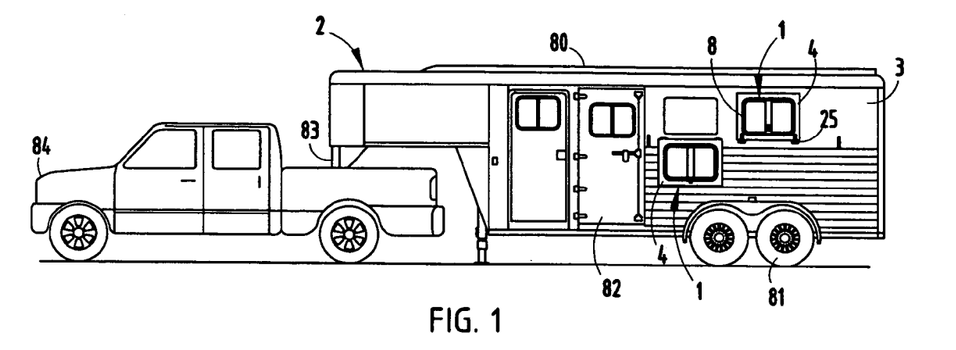
FIG. 1 is a side elevational view of an animal trailer shown attached to a tow vehicle, and incorporating a window assembly embodying the present invention.

The illustrated horse trailer 2 is of the type that has at least one horse stall for transporting at least one horse. The trailer 2 shown in FIG. 1 has vertical exterior walls 3 adapted to confine horses during transportation, a top 80, wheels 81, access doors 82 and a gooseneck 83 for attaching trailer 2 to a tow vehicle 84. Two feed doors 4, with window assemblies 1 incorporated therein, are hingedly mounted on trailer walls 3, and are disposed at the stalls for allowing ventilation and light to enter the stalls. The left hand feed door 4 and associated window assembly 1 (as illustrated in FIG. 1) is shown in the lowered, open position, whereas the right hand feed door 4 and associated window assembly 1 (as illustrated in FIG. 1) is shown in the raised, closed position.

Figure 8:
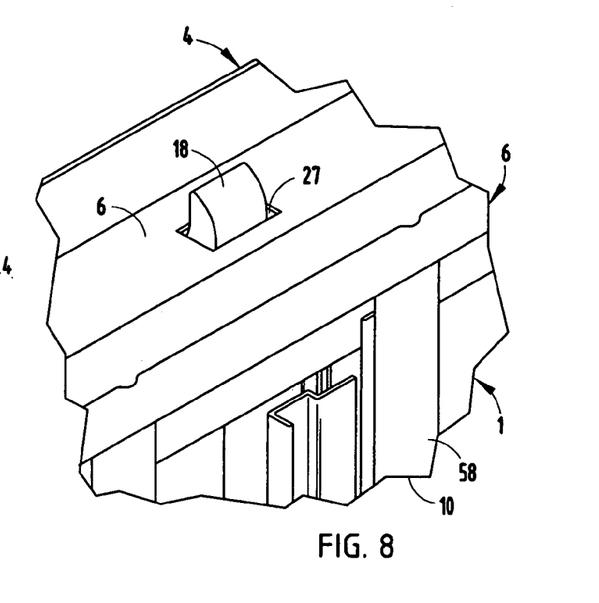
FIG. 8 is a fragmentary perspective view of the feed door and latch arm protruding therefrom.

Both of the illustrated dropdown feed doors 4 have two hinges 25 disposed along the bottom portion 6b of the associated feed door 4. The opening 8 in each feed door 4 is positioned generally centrally inside the outer perimeter of the feed door 4. As best illustrated in FIG. 8, an aperture 26 is disposed through the upper portion 6a of window frame 6, and a vertically aligned aperture 27 extends through the upper perimeter portion of feed door 4, through which the upper end of latch arm 18 extends for reception in a latch receiver aperture 28 disposed in an exterior wall 3 of trailer 2. The illustrated interconnected top, bottom and opposite side portions, 6a, 6b, and 6c, respectively, of window frame 6 are arranged in a generally rectangular configuration with rounded corners, and are configured for close reception in the opening 8 in feed door 4, using conventional weather stripping 32. The weather stripping 32 creates a weather tight seal around each window assembly 1.

Each of the illustrated window assemblies 1 has an exterior face 34 with two panes of glass 36, wherein mullion 10 extends vertically and separates the two panes of glass 36. The two panes of glass 36 are in mounted in side-by-side, parallel planes, with one of the panes of glass 36 being slidable along tracks in the frame 6 to allow opening and closing of a portion of the window assembly 1. A screen 35 is located on the interior side of the slidable glass pane 36 to allow air into the trailer 2, while keeping pests, insects, etc. outside.

In the illustrated example, mullion 10 on window assembly 1 has a rearwardly opening channel or internal cavity 40. Latch assembly 17 is generally disposed in the cavity 40 of mullion 10 to protect the mechansims, and improve the esthetics of the window assembly 1. The upper end of flexible line 24 is operably connected with a lower portion 42 of the latch arm 18, and the lower end of the flexible line 24 is operably connected with slide 22. A slide bearing 44 (FIG. 9) is mounted in the cavity 40 of mullion 10 adjacent an upper end thereof. The latch arm 18 is slidingly received and retained in the slide bearing 44 and guides the upper portion of the latch arm 18 from window frame aperture 26 and door aperture 27 into latch receiver aperture 28 (see FIGS. 7 and 8) when slide 22 is in the latched position, as indicated by arrow 46. Upon actuation of the latch actuator 20 toward the unlatched position, tension is applied to flexible line 24 thereby moving flexible line 24, and shifting latch arm 18 in a downward direction indicated by arrow 48. Consequently, latch arm 18 is retracted from the latch receiver aperture 28 disposed in the exterior wall 3 of the horse trailer 2, such that feed door 4 is free to be rotated to the lowered, open position.

Figures 4, 5:
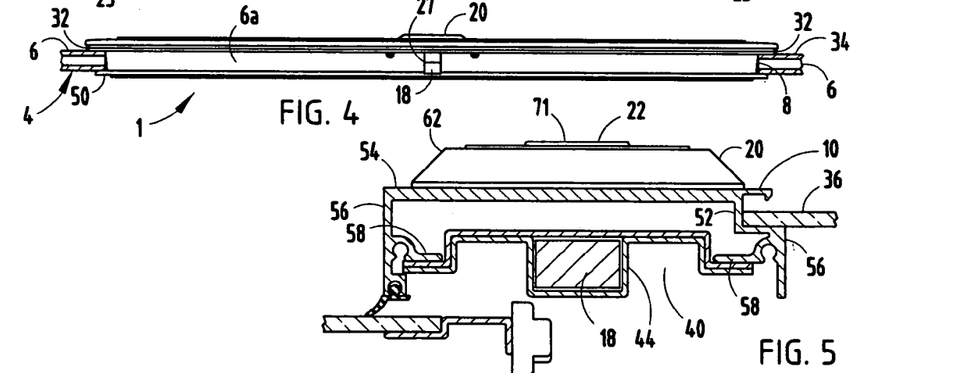
FIG. 4 is a top plan view of the feed door and window assembly of FIG. 3.
FIG. 5 is a horizontal cross-sectional view of a mullion and latch arm portion of the window assembly, taken along the line V-V, FIG. 3.

FIG. 4 illustrates the extended upper portion of the latch arm 18 and an interior flange portion 50 of window frame 6. The interior flange 50 rests against an interior side of feed door 4, and keeps weather stripping 32 in place.

Figure 9:
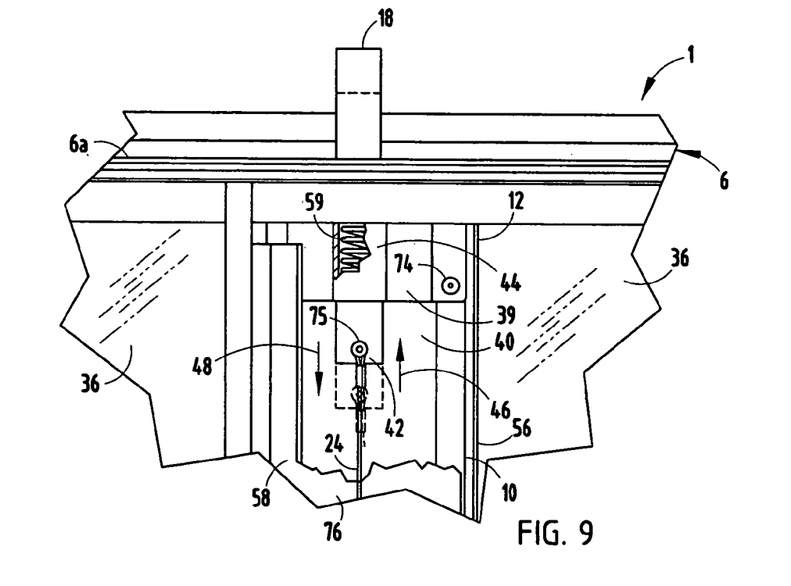
FIG. 9 is a fragmentary, rear elevational view of the latch arm, shown in locked and unlocked positions.

As shown in FIG. 5, mullion 10 has a generally U-shaped construction, defined by a flat central web portion 54 and a pair of side flanges 56 that extend perpendicularly inwardly on opposite side edges of the web portion 54 to form internal cavity 40 therebetween. Slide bearing 44 is fixedly connected to the pair of side flanges 56 at extensions 58 and allows the latch arm 18 to move vertically in and out of the locked and unlocked positions shown in FIG. 9. As shown in FIG. 9, slide bearing 44 preferably includes a spring 59 which resiliently urges latch arm 18 toward a normally, fully extended position.

Figure 6:
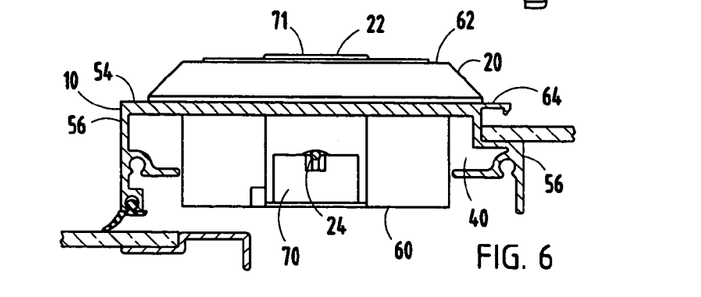
FIG. 6 is a horizontal cross-sectional view of the mullion, taken along the line VI-VI, FIG. 3, showing a latch actuator portion of the window assembly.

In the example shown in FIG. 6, latch actuator 20 is connected to flexible line 24, and is enclosed by a cover 60. The illustrated flexible line 24 is a braded metal cable which provides substantial strength, and resists stretching. Latch actuator 20, flexible line 24 and cover 60 are all located with in the cavity 40 of mullion 10. Slide 22 is retained in an exterior housing 62 disposed on the exterior side 64 of the web portion 54 of mullion 10. The exterior housing 62 is adapted to secure the latch actuator 20 to mullion 10. As described in greater detail below, latch actuator 20 can be attached to mullion 10 in a variety of manners, such as adhesive, cinch clamps, screw-type fasteners, or the like.

Figure 7:
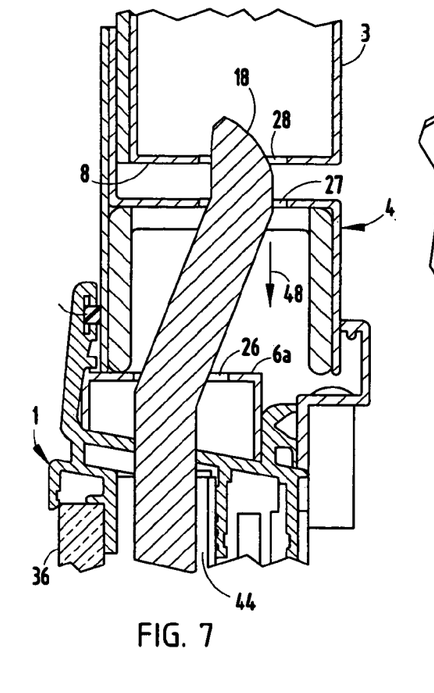
FIG. 7 is an enlarged, vertical cross-sectional view of the latch arm.

In FIGS. 7, 8, and 9, latch arm 18 is shown in the extended or raised position. When slide 22 is manually shifted downwardly by the user, latch arm 18 is retracted from latch receiver aperture 28, thereby releasing the feed door 4, and allowing it to rotate about hinges 25. When the downward opening force applied by the user is removed from slide 22, latch arm 18 is spring biased outwardly by spring 59 disposed inside slide bearing 44. As a result, when feed door 4 is in the closed position, latch arm 18 protrudes beyond aperture 26 and into engagement with the latch receiver aperture 28. When feed door 4 is in the open position, latch arm 18 simply protrudes out the top aperture 27 in feed door 4.

Figure 10:
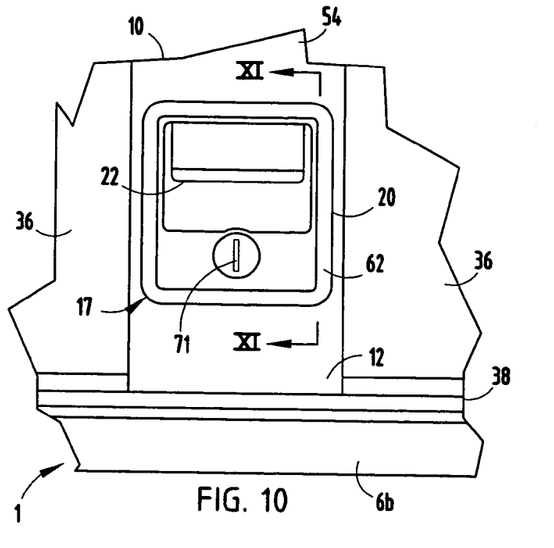
FIG. 10 is a fragmentary front elevational view of the latch actuator.
Figure 11:
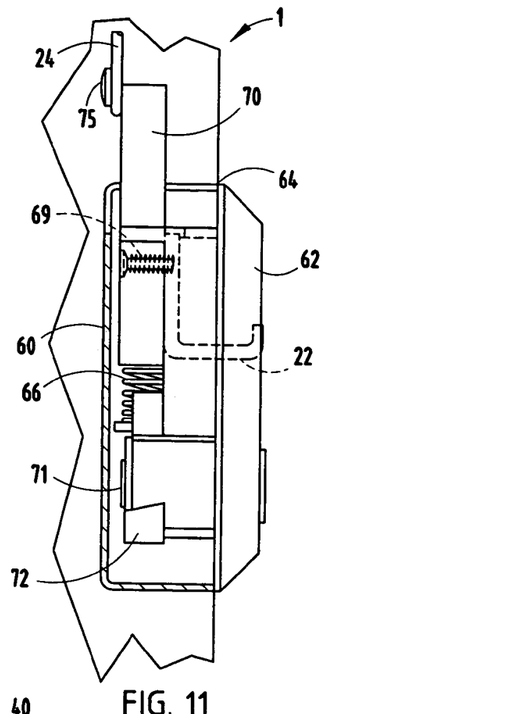
FIG. 11 is a vertical cross-sectional view of the latch actuator, taken along the line XI-XI, FIG. 10.
Figure 12:
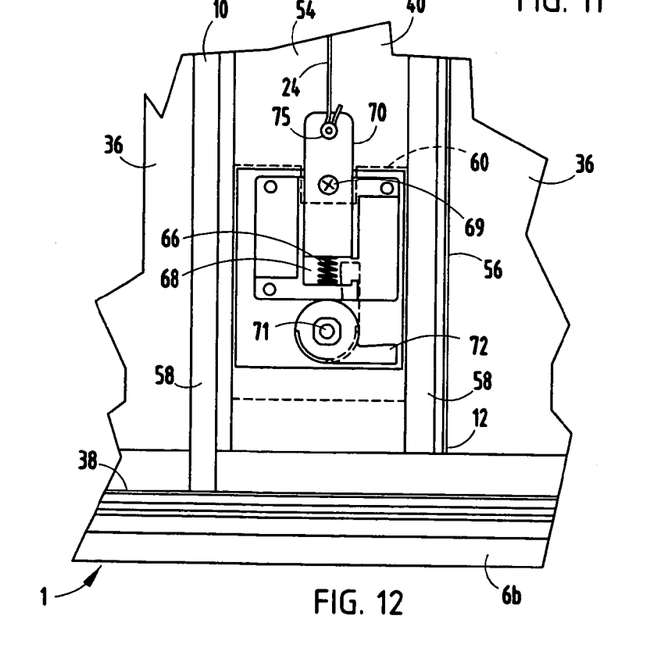
FIG. 12 is a rear elevational view of the latch actuator with the cover plate removed to reveal internal construction.

With reference to FIGS. 10 and 11, the illustrated latch actuator 20 includes an outwardly extending bar shaped for grasping, as well as an internal spring 66 located in a spring chamber 68, which biases slide 22 upwardly to the latched position. Latch actuator 20 also includes a fastener 69, and an interior line shifting mechanism 70 located in cavity 40 and connected to slide 22. Application of force to slide 22 is transferred through the fastener 69 to the interior line shifting mechanism 70, and consequently to flexible line 24. The user may also lock the slide 22 to keep trespassers from opening feed door 4. To lock slide 22, a user inserts a key into a lock mechanism 71 located in the latch actuator 20. Upon rotation of the key, lock mechanism 71 rotates a deadbolt 72 into spring chamber 68 (FIG. 12), thereby preventing slide 22 from being lowered. Accordingly, latch arm 18 cannot be withdrawn from the latch receiver 28.

In one example of the present invention, feed door 4 is fabricated in the following manner. Rigid marginal frame 6 is formed from a single length of channel stock to define the interconnected top, bottom and opposite side portions 6a, 6b and 6c, respectively, shown in FIGS. 3 and 4. The opposite ends of the formed channel member are rigidly interconnected, such as by welding and the like to create rigid marginal frame 6. A length of U-shaped mullion channel is cut to length to form a mullion 10. The cut mullion 10 is then positioned vertically between the top and bottom portions 6a, 6b of marginal frame 6. The opposite ends of mullion 10 are rigidly connected with marginal frame 6 by means such as screws, welding or the like. Slide bearing 44 is positioned across the upper portion of mullion 10, as shown in FIGS. 5 and 9, and attached to the flange extensions 58 by fasteners, such as the pop rivets 74 shown in FIG. 9. Latch arm 18 is slidably received in slide bearing 44, and projects upwardly from the top portion 6a of window frame 6 for shifting selectively between the locked position, wherein latch arm 18 engages one of the adjacent walls of the animal transport vehicle to retain feed door 4 in the raised, closed position, and the unlocked position, wherein feed door 4 is free to be rotated about hinges 25 to the lowered, open position. The spring 59 in slide bearing 44 urges latch arm 18 toward a normally extended position. Latch actuator 20 is then mounted on mullion 10 at a vertically spaced apart location from latch arm 18. More specifically, a generally rectangular window or opening is formed through the web portion 54 of mullion 10 at a predetermined vertical location therealong. It is noteworthy that latch actuator 20 can be located at a wide variety of different vertical locations along mullion 10, so as to accommodate a wide variety of different height users. Once the desired location for latch actuator 20 has been selected, latch actuator 20 is mounted in the associated window in mullion 10, using exterior housing 62, which extends over the exterior side of mullion 10 to cover the associated opening. Flexible line 24 is then cut to length, so as to interconnect the lower end of latch arm 18 with the upper end of latch actuator 20. Because latch arm 18 and latch actuator mechanism 70 are latch biased to normally extended positions, the fabrication and assembly of flexible line 24 is greatly facilitated. In the illustrated example, the opposite ends of flexible line 24 are looped over to form eyelets through which fasteners or anchors 75 are inserted to positively attach the ends of flexible line 24 to latch arm 18 and latch actuator 20. In the event latch actuator 20 is located near the top of mullion 10, flexible line 24 will be shorter than if latch actuator 20 is located near the bottom of mullion 10. After the installation of flexible line 24, movement of slide 22 between the latched and unlatched positions shifts the latch arm 18 between the locked and unlocked positions. It is noteworthy that once assembled, latch arm 18, slide bearing 44, flexible line 24 and the shifting portion of latch actuator 20 are all disposed within the interior of the rearward facing cavity 40 of mullion 10, so as to protect the working portions of the assembly and improve the interior esthetics of the window assembly 1. A cover plate 76 (FIG. 9) is then attached to the extension flanges 58 on mullion 10 to fully enclose cavity 40, as well as the latch assembly 17.

An opening 8 is then formed in feed door 4, which is sized and shaped for close reception of window frame 6 therein. As noted above, weather stripping 32 is positioned between window frame 6 and feed door 4 to create a weather tight seal. During insertion of window assembly 1 into feed door opening 8, the outer end of latch arm 18 is inserted through aperture 27 in the top portion of feed door 4, such that it protrudes therefrom, and will engage in the latch receiver aperture 28 in the exterior wall 3 of trailer 2 in the manner illustrated in FIG. 7. It is noteworthy that since latch assembly 17 is fully integrated or incorporated into window assembly 1, there is no need to mount a separate latch in feed door 4, or route latch mechanics through the interior of feed door 4. Consequently, window assembly 1 provides reduced fabrication cost and complexity.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is as follows:

1. In an animal transport vehicle of the type having upright exterior walls arranged to define at least one interior animal stall, the improvement of a windowed dropdown feed door, comprising:
   a rigid door panel shaped to close an associated opening in one of said walls of said animal transport vehicle, and including a centrally disposed window opening therethrough;
   at least one hinge connected with a bottom portion of said door panel and said one wall of said animal transport vehicle to permit said feed door to be rotated between a raised, closed position and a lowered, open position;
   a window assembly, comprising:
   a rigid marginal frame having interconnected top, bottom and side portions configured for close reception in said window opening in said feed door;
   a mullion member extending vertically between said top and said bottom portions of said marginal frame, and having opposite ends thereof connected with said marginal frame;
   a latch assembly, comprising:
   a latch arm supported by said mullion member, projecting upwardly from a top portion of said door panel and configured for shifting selectively between a locked position,
   wherein said latch arm engages said one wall of said animal transport vehicle to retain said feed door in said raised, closed position, and an unlocked position, wherein said feed door is free to be rotated to said lowered, open position;
   a latch actuator mounted on said mullion member at a predetermined position spaced vertically apart from said latch arm, and including a slide which is translated vertically between latched and unlatched positions; and
   a connector member having one end thereof operably connected with said latch arm, and an opposite end thereof operably connected with said slide, whereby movement of said slide between said latched and unlatched positions shifts said latch arm between said locked and unlocked positions, such that said latch assembly is integrated into said window assembly to facilitate fabrication of said feed door.

2. An animal transport vehicle as set forth in claim 1, wherein:
   said connector member comprises a flexible line; and including
   means for mounting said latch actuator at a variety of different vertical locations along said mullion member by adjusting the length of said flexible line, so as to accommodate convenient access by a wide variety of different height users.

3. An animal transport vehicle as set forth in claim 2, wherein:
   said latch actuator is positioned adjacent a lower portion of said mullion member.

4. An animal transport vehicle as set forth in claim 3, wherein:
   said mullion member comprises a generally U-shaped channel, having a generally flat central web portion thereof extending along an exterior face of said window assembly, and a pair of side flanges extending perpendicularly inwardly from opposite side edges of said web portion to define an internal cavity therebetween.

5. An animal transport vehicle as set forth in claim 4, wherein:
   said latch actuator includes an exterior housing which supports said slide and mounts on an exterior side of said web portion of said mullion member.

6. An animal transport vehicle as set forth in claim 5, wherein:
   said latch actuator includes an interior line shifting mechanism positioned in said cavity of said mullion member.

7. An animal transport vehicle as set forth in claim 6, wherein:

said latch assembly includes a slide bearing mounted on said mullion member adjacent an upper end thereof in which a lower portion of said latch arm is slidingly received and retained.

8. An animal transport vehicle as set forth in claim 7, wherein:
said slide bearing is positioned in said cavity of said mullion member.

9. An animal transport vehicle as set forth in claim 8, wherein:
said flexible line is positioned in and extends along said cavity of said mullion member.

10. A windowed dropdown feed door for animal transport vehicles of the type having upright exterior walls arranged to define at least one interior animal stall, comprising:
a rigid door panel shaped to close an associated opening in one of the walls of the animal transport vehicle, and including a centrally disposed window opening therethrough;
at least one hinge connected with a bottom portion of said door panel and the one wall of the animal transport vehicle to permit said feed door to be rotated between a raised, closed position and a lowered, open position;
a window assembly, comprising:
a rigid marginal frame having interconnected top, bottom and side portions configured for close reception in said window opening in said feed door;
a mullion member extending vertically between said top and said bottom portions of said marginal frame, and having opposite ends thereof connected with said marginal frame;
a latch assembly, comprising:
a latch arm supported by said mullion member, projecting upwardly from a top portion of said door panel and configured for shifting selectively between a locked position, wherein said latch arm is configured to engage the one wall of said animal transport vehicle to retain said feed door in said raised, closed position, and an unlocked position, wherein said feed door is free to be rotated to said lowered, open position;
a latch actuator mounted on said mullion member at a predetermined position spaced vertically apart from said latch arm, and including a slide which is translated vertically between latched and unlatched positions; and
a connector member having one end thereof operably connected with said latch arm, and an opposite end thereof operably connected with said slide, whereby movement of said slide between said latched and unlatched positions shifts said latch arm between said locked and unlocked positions, such that said latch assembly is integrated into said window assembly to facilitate fabrication of said feed door.

11. A feed door as set forth in claim 10, wherein:
said connector member comprises a flexible line; and including
means for mounting said latch actuator at a variety of different vertical locations along said mullion member by adjusting the length of said flexible line, so as to accommodate convenient access by a wide variety of different height users.

12. A feed door as set forth in claim 11, wherein:
said latch actuator is positioned adjacent a lower portion of said mullion member.

13. A feed door as set forth in claim 12, wherein:
said mullion member comprises a generally U-shaped channel, having a generally flat central web portion thereof extending along an exterior face of said window assembly, and a pair of side flanges extending perpendicularly inwardly from opposite side edges of said web portion to define an internal cavity therebetween.

14. A feed door as set forth in claim 13, wherein:
said latch actuator includes an exterior housing which supports said slide and mounts on an exterior side of said web portion of said mullion member.

15. A feed door as set forth in claim 14, wherein:
said latch actuator includes an interior line shifting mechanism positioned in said cavity of said mullion member.

16. A feed door as set forth in claim 15, wherein:
said latch assembly includes a slide bearing mounted on said mullion member adjacent an upper end thereof in which a lower portion of said latch arm is slidingly received and retained.

17. A feed door as set forth in claim 16, wherein:
said slide bearing is positioned in said cavity of said mullion member.

18. A feed door as set forth in claim 17, wherein:
said flexible line is positioned in and extends along said cavity of said mullion member.

19. A feed door as set forth in claim 10, wherein:
said mullion member comprises a generally U-shaped channel, having a generally flat central web portion thereof extending along an exterior face of said window assembly, and a pair of side flanges extending perpendicularly inwardly from opposite side edges of said web portion to define an internal cavity therebetween;
said latch actuator includes an exterior housing which supports said slide and mounts on an exterior side of said web portion of said mullion member;
said latch actuator includes an interior line shifting mechanism positioned in said cavity of said mullion member;
said latch assembly includes a slide bearing mounted on said mullion member adjacent an upper end thereof in which a lower portion of said latch arm is slidingly received and retained;
said slide bearing is positioned in said cavity of said mullion member; and
said flexible line is positioned in and extends along said cavity of said mullion member.

20. A window assembly for dropdown feed doors of the type used for animal transport vehicles having upright exterior walls arranged to define at least one interior stall, comprising:
a rigid marginal frame having interconnected top, bottom and opposite side portions configured for close reception in an associated opening in an associated feed door;
a mullion member extending vertically between said top and said bottom portions of said marginal frame, and having opposite ends thereof connected with said marginal frame;
a latch assembly, comprising:
a latch arm supported by said mullion member, projecting upwardly from said top portion of said marginal frame and configured for shifting selectively between a locked position, wherein said latch arm engages an adjacent wall of the animal transport vehicle to retain the feed door in a raised, closed position, and an unlocked position, wherein the feed door is free to be rotated to a lowered, open position;
a latch actuator mounted on said mullion member at a predetermined position spaced vertically apart from said latch arm, and including a slide which is translated vertically between latched and unlatched positions; and a connector member having one end thereof operably connected with said latch arm, and an opposite end thereof operably connected with said slide, whereby movement of said slide between said latched and unlatched positions shifts said latch arm between said locked and unlocked positions, such that said latch assembly is integrated into said window assembly to facilitate fabrication of the feed door.

21. A window assembly as set forth in claim 20, wherein:
said connector member comprises a flexible line; and including
means for mounting said latch actuator at a variety of different vertical locations along said mullion member by adjusting the length of said flexible line, so as to accommodate convenient access by a wide variety of different height users.

22. A window assembly as set forth in claim 21, wherein:
said latch actuator is positioned adjacent a lower portion of said mullion member.

23. A window assembly as set forth in claim 22, wherein:
said mullion member comprises a generally U-shaped channel, having a generally flat central web portion thereof extending along an exterior face of said window assembly, and a pair of side flanges extending perpendicularly inwardly from opposite side edges of said web portion to define an internal cavity therebetween.

24. A window assembly as set forth in claim 23, wherein:
said latch actuator includes an exterior housing which supports said slide and mounts on an exterior side of said web portion of said mullion member.

25. A window assembly as set forth in claim 24, wherein:
said latch actuator includes an interior line shifting mechanism positioned in said cavity of said mullion member.

26. A window assembly as set forth in claim 25, wherein:
said latch assembly includes a slide bearing mounted on said mullion member adjacent an upper end thereof in which a lower portion of said latch arm is slidingly received and retained.

27. A window assembly as set forth in claim 26, wherein:
said slide bearing is positioned in said cavity of said frame cross member.

28. A window assembly as set forth in claim 27, wherein:
said flexible line is positioned in and extends along said cavity of said mullion member.

29. A window assembly as set forth in claim 20, wherein:
said mullion member comprises a generally U-shaped channel, having a generally flat central web portion thereof extending along an exterior face of said window assembly, and a pair of side flanges extending perpendicularly inwardly from opposite side edges of said web portion to define an internal cavity therebetween;
said latch actuator includes an exterior housing which supports said slide and mounts on an exterior side of said web portion of said mullion member;
said latch actuator includes an interior line shifting mechanism positioned in said cavity of said mullion member;
said latch assembly includes a slide bearing mounted on said mullion member adjacent an upper end thereof in which a lower portion of said latch arm is slidingly received and retained;
said slide bearing is positioned in said cavity of said frame cross member; and
said flexible line is positioned in and extends along said cavity of said mullion member.

30. A method for making a window assembly for drop-down feed doors of the type used for animal transport vehicles having upright exterior walls arranged to define at least one interior stall, comprising:
forming a rigid marginal frame having interconnected top, bottom and opposite side portions configured for close reception in an associated opening in an associated feed door;
positioning a mullion member vertically between the top and the bottom portions of the marginal frame, and operably connecting opposite ends thereof with the marginal frame;
mounting a slidable latch arm to the mullion member to project upwardly from the top portion of the marginal frame for shifting selectively between a locked position, wherein the latch arm engages an adjacent wall of the animal transport vehicle to retain the feed door in a raised, closed position, and an unlocked position, wherein the feed door is free to be rotated to a lowered, open position;
providing a latch actuator for mounting on the mullion member at a predetermined position spaced vertically apart from the latch arm, and including a slide which is translated vertically between latched and unlatched positions;
providing a connector member having one end thereof configured for operable connection with the latch arm, and an opposite end thereof configured for operable connection with the slide;
mounting the latch actuator at a predetermined vertical location on the mullion member spaced vertically apart from the latch arm; and
connecting one end of the connector member with the latch arm, and the opposite end thereof with the slide, whereby movement of the slide between the latched and unlatched positions shifts the latch arm between the locked and unlocked positions, such that the latch arm, latch actuator and connector member are integrated into the window assembly to facilitate fabrication of the feed door.

31. A method as set forth in claim 30, wherein:
said connector member providing step comprises providing a flexible line;
said latch actuator mounting step comprises mounting the latch actuator at one of a variety of different vertical locations along the mullion member to accommodate convenient access by a user of specified height; and including
adjusting the length of the flexible line in accordance with the selected vertical location of the latch actuator on the mullion member.

32. A method as set forth in claim 31, wherein:
said mounting step includes positioning the latch actuator adjacent a lower portion of the mullion member.

33. A method as set forth in claim 32, wherein:
said mullion positioning step includes forming the mullion member in a generally U-shaped channel, having a generally flat central web portion thereof extending along an exterior face of the window assembly, and a pair of side flanges extending perpendicularly inwardly from opposite side edges of the web portion to define an internal cavity therebetween.

34. A method as set forth in claim 33, wherein:
said latch actuator providing step includes providing an exterior housing which supports said slide, and mounting the same on an exterior side of the web portion of the mullion member.

35. A method as set forth in claim 34, wherein:
said latch actuator providing step includes providing an interior line shifting mechanism, and positioning the same in the cavity of the mullion member.

36. A method as set forth in claim 35, wherein:
said latch arm mounting step includes mounting a slide bearing on the mullion member adjacent an upper end thereof in which a lower portion of the latch arm is slidingly received and retained; and positioning the slide bearing in the cavity of said mullion member.

37. A method as set forth in claim 36, wherein:
said connector member connecting step includes positioning the flexible line in the cavity of the mullion member.

* * * * *